Oct. 23, 1945. G. L. ORME ET AL 2,387,675
RIGGING HOOK
Filed May 18, 1944
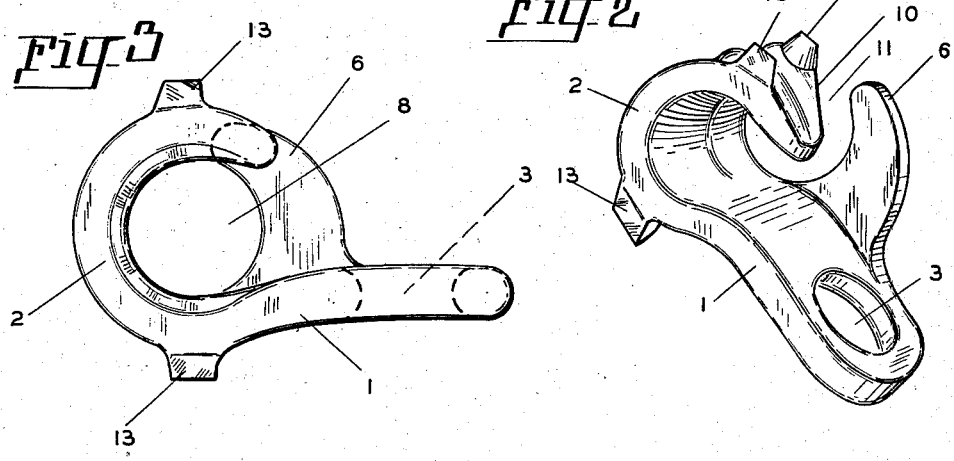
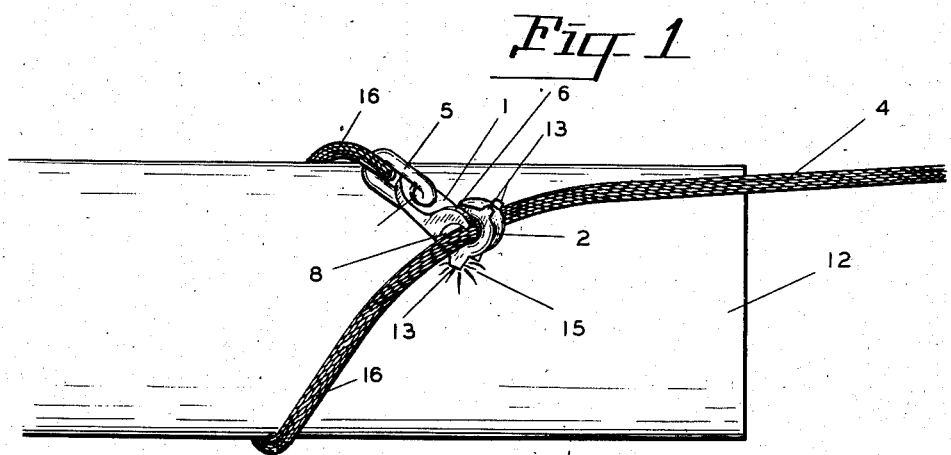
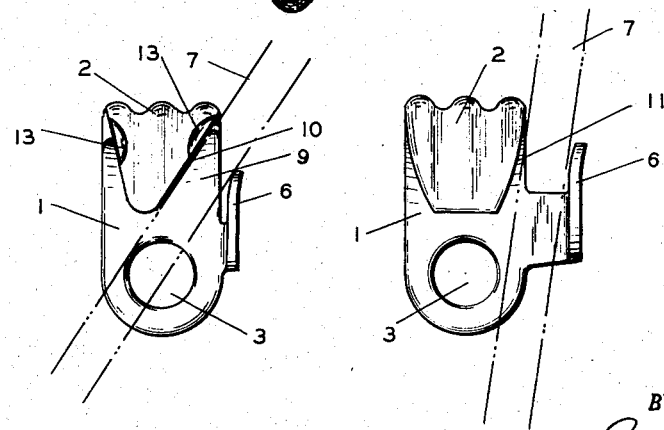
INVENTORS
GRANT L. ORME
CLARENCE R. JONES
AUBREY L. FLETCHER Patented Oct. 23, 1945

2,387,675

UNITED STATES PATENT OFFICE 2,387,675

RIGGING HOOK

Grant L. Orme, Clarence R. Jones, and Aubrey L. Fletcher, Eugene, Oreg.

Application May 18, 1944, Serial No. 536,188

4 Claims. (Cl. 294—82)

This invention relates to rigging hooks and is particularly adapted to choker hooks and the like.

The primary object of the invention is to devise a rigging hook that will maintain the cable in place after it has been run through the hook, preventing the hook from accidentally disengaging itself from the cable.

A further object of the invention is to provide a non-skid feature consisting of outwardly extending lugs or spurs forming a part of the hook. These lugs or spurs when used in connection with chokers prevent the choker loop from being pulled off the object being handled, as for instance the end of a log.

Referring to the drawing:

Figure 1 illustrates our new and improved rigging hook being used in connection with a choker cable secured to a log.

Figure 2 is a perspective view of our new and improved hook illustrating the cable retaining device and the non-skid feature.

Figure 3 is a side view of the hook, illustrating both of these features.

Figure 4 is a plan view of the hook as illustrated in Figures 1, 2 and 3.

Figure 5 is another preferred embodiment of our cable locking feature on a slightly modified basis.

In the drawing:

Our new and improved rigger hook consists of a main body portion 1, having a looped end 2 hereinafter termed the main bill forming the hook proper. The hook has the usual eye 3 for securing the same to the end of the cable 4, as by the link 5. Heretofore considerable time has been lost by having rigger hooks and the like become disengaged from the cable as the cables become slack in the operation thereof. In order to prevent the unlatching of the hook we have provided a cable retaining block 6 hereinafter termed the auxiliary bill, forming part of the hook, for maintaining the cable within the hook 2 while in use.

By referring to Figures 1 and 4 the cable is put through between the block 6 and the hook as indicated by the broken lines 7, as in Figure 4, then brought around to the position shown in Figure 1, the block 6 preventing the cable from coming out of the hook when the cable has been slacked off, thereby saving considerable time in reconnecting the hook to the cable.

It will be noted that the block 6, referring to Figure 3, forms an overlapping enclosure 8 about the cable when the hook is at right angles to the cable. A space 9 is provided between the edge 10 of the hook and the block 6 for permitting the entrance of the cable when the hook is brought to an angle to the center line of the cable.

We have shown in Figure 5 a slightly modified form by spacing the block 6 located at a greater distance from the edge of the hook. In this form of hook the hook will have to be turned to a greater angle to the center line of the cable in order to allow entrance of the same between the block and the hook at 11. In this type of hook it requires more time in order to apply the hook to the cable, but affords a much greater degree of safety.

In the operation of rigging hooks in connection with logs, piling and the like the choker loop and hook often slips off the end of the log. In order to prevent this difficulty we have provided lugs or spur in connection with the hook to engage the surface of the log, preventing the choker loop from slipping off the end of the log as shown in Figure 1.

The lugs or spurs 13 are located about the outer edges of the hook projecting outwardly for engaging the object being handled, as the log shown in Figure 1, where the spurs are shown engaging the log at 15. There may be any number of spurs located about the hook at any desired location, depending upon the requirements of the rigger hook being used.

We do not wish to be limited to the exact structure as illustrated and described, as other forms of embodiment of our invention may be substituted still coming within the scope of our claims.

What is claimed is:

1. A rigging hook comprising a flat body formed with an eye at one end and formed into a return bend at the opposite end, said return bend providing a main bill which, at its junction with the body is of the full width of the body, the flat body being formed adjacent one longitudinal edge thereof with an upstanding lip at right angles to the flat body and spaced from the main bill of the hook, that edge of the upstanding lip toward the main bill being curved opposite to the direction of the curvature of the main bill and substantially on the same radii, the upstanding lip and the adjacent edge of the main bill being spaced apart to permit the entrance of a cable through such space and into a plane including the curvatures of the main bill and the lip.

2. A construction as defined in claim 1 wherein the upstanding lip extends from a portion of the flat body laterally offset from the longitudinal edge thereof.

3. A construction as defined in claim 1 wherein spurs project from the lower surface of the flat body in line with the main bill whereby pull on the rigging hook forces the spurs into the surface of the log.

4. A construction as defined in claim 1 wherein spurs project upwardly from the upper surface of the main bill and wherein spurs project from the lower surface of the flat body opposite the main bill.

GRANT L. ORME.
CLARENCE R. JONES.
AUBREY L. FLETCHER.